United States Patent
La Heij et al.

[15] 3,700,757
[45] Oct. 24, 1972

[54] PROCESS FOR THE PREPARATION OF GEL-CONTAINING SYNTHETIC CONJUGATED DIENE SOLUTION POLYMERS

[72] Inventors: Gerardus E. La Heij; Gerrit J. Van Amerongen, both of Amsterdam, Netherlands

[73] Assignee: Shell Oil Company, New York, N.Y.

[22] Filed: June 30, 1971

[21] Appl. No.: 158,543

Related U.S. Application Data

[62] Division of Ser. No. 797,712, Feb. 7, 1969, Pat. No. 3,642,762.

[30] Foreign Application Priority Data

March 15, 1968 Great Britain..........12,779/68

[52] U.S. Cl..............260/894, 260/29.7 D, 260/85.1, 260/94.7 A
[51] Int. Cl..........C08d 9/16, C08d 5/02, C08d 5/04

[58] Field of Search......................260/894

[56] References Cited

UNITED STATES PATENTS

| | | | |
|---|---|---|---|
| 3,335,202 | 8/1967 | Giulio et al. | 260/889 |
| 3,083,175 | 3/1963 | Safford et al. | 260/894 |
| 2,975,151 | 3/1961 | Ropp | 260/29.7 |
| 3,642,762 | 2/1972 | La Heij et al. | 260/94.7 |
| 3,658,732 | 4/1972 | Ballini et al. | 260/5 |

*Primary Examiner*—John C. Bleutge
*Assistant Examiner*—John Seibert
*Attorney*—William H. Myers et al.

[57] ABSTRACT

Conjugated diene solution rubber compositions having improved green strength combined with satisfactory processability are obtained by treatment of a solution diene rubber, in aqueous dispersion, with a redox hydroperoxide system to produce a composition having 5–60 weight percent toluene-insoluble gel.

3 Claims, No Drawings

PROCESS FOR THE PREPARATION OF GEL-CONTAINING SYNTHETIC CONJUGATED DIENE SOLUTION POLYMERS

This application is a division of application Ser. No. 797,712, filed Feb. 7, 1969, now U.S. Pat. No. 3,642,762.

The invention relates to a process for the preparation of modified synthetic conjugated diene polymers from solution polymers by a treatment of aqueous dispersions of the solution polymers. "Solution polymers" are understood to be the synthetic conjugated diene polymers to be modified whenever prepared in dissolved condition. The term "polymers" comprises not only homopolymers, but also copolymers of different conjugated dienes or of conjugated dienes with other monomers.

The invention also relates to products comprising one or more modified polymers obtained by the said process or blends of these polymers with one or more different polymers, including the unmodified polymers from which the modified polymers are prepared. The envisaged products primarily comprise the final aqueous dispersions or latices as prepared by the present process, which dispersions may or may not contain antioxidants, fillers (especially reinforcing fillers, such as carbon black or small-particle-size silicas), extender oils or the like. Dried polymers or polymer blends isolated from the said dispersions, by coagulation or precipitation, or compositions of these polymers with one or more of the said additives, are also to be considered as products according to the present invention. Finally, the manufacture of vulcanized articles by vulcanizing the said dried polymers or polymer blends or compositions thereof or by vulcanizing the latices in a foamed condition are within the scope of the present invention as well.

The invention particularly relates to the preparation of dispersions or compositions of modified conjugated diene solution polymers, in which at least 40 percent and preferably at least 80 percent of the diene units are bound by cis-1,4 addition (determined by means of nuclear spin resonance), preferably isoprene polymers.

Suitable diene polymers to be modified are especially homopolymers and copolymers of isoprene prepared in solution by means of a lithium hydrocarbyl compound.

However, the process according to the invention can, if desired, also be applied very suitably to solution polybutadiene prepared by means of cobalt or nickel compounds together with aluminum alkyl compounds, and to copolymers of butadiene with styrene prepared in solution, again by means of a lithium hydrocarbyl compound. Other suitable solution polymers are those obtained by means of metallic sodium, such as sodium polybutadienes or "Alfin" diene polymers. Finally, the said compositions can also be obtained from polymers prepared in solution in the presence of catalysts donating free radicals.

The process according to the invention aims at preparing from the said polymers modified polymers whose compositions with reinforcing fillers and, if desired, other additives, in unvulcanized condition have a satisfactory tensile strength ("green strength") and/or whose compositions (with or without reinforcing agents) in vulcanized conditions have an improved modulus.

Now, in accordance with this invention, it has now been found that these aims can be achieved by treating an aqueous dispersion of the solution polymer with a redox system containing a hydroperoxidic initiating compound, in the substantial absence of a mono-olefinically unsaturated monomer. "Substantial absence of a mono-olefinic monomer" is understood to mean that either no mono-olefinic monomer is present at all or that such a monomer is present in an amount of at most 1.0%w on polymer to be modified.

The temperature at which the treatment with the redox system takes place is preferably within the range of $-10°$ to $+50°$ C., although higher or lower temperatures may also be applied. The most preferred temperature is within the range of $15°$ to $30°$ C.

The duration of the treatment may vary from 5 minutes to 8 hours. Usually the reaction period is about ½ to 2 hours. The redox treatment can be terminated by adding a short-stopping agent.

The most suitable solids content of the polymer dispersion to be treated with the redox system is at least 60%w.

The concentration of the hydroperoxidic initiating compound to be applied depends on the type of the hydroperoxide, the temperature of the treatment, the reaction time, the concentration of the other components of the redox system and the product properties envisaged.

Preferably, a concentration of the hydroperoxidic initiating compound is used within the range of 0.0001 to 0.5%w of -OOH groups, calculated on polymer.

As to the hydroperoxide, preference is given to cumene hydroperoxide. Other preferred components of the redox system to be used in addition to the hydroperoxide are ferrous sulfate (usually called the activator) and sodium formaldehyde sulfoxylate (usually called the reductant). Alkyl hydroperoxides such as tert-butyl hydroperoxide may be used, as well as menthane hydroperoxide, and phenyl cyclohexyl hydroperoxide.

The said activator or the said reductant or both of them may be replaced by another activator or another reductant. Redox systems which do not contain an activator, such as those systems which merely comprise a hydroperoxidic initiator and a reductant, e.g., a reductant of the amine type or sodium formaldehyde sulfoxylate, may also be applied. If desired, a complexing agent may be used as well. Preferred complexing agents are the alkali metal salt of ethylene diamine tetraacetic acid, e.g., disodium dihydrogen ethylene diamine tetraacetate.

The most attractive way to perform the present process is to start from a solution of the polymer obtained after the polymerization, by emulsifying this solution in water (preferably in the presence of an antioxidant) and removing the polymer solvent from the aqueous emulsion thus prepared. Thereupon the resulting aqueous polymer dispersion, usually called "artificial latex," is subject to a redox treatment as described above.

The improved properties of the modified polymers prepared in accordance with the present process as compared with those of the unmodified solution polymers are to be attributed to the presence of a gel which is formed during the redox treatment. This gel seems to have a favorable structure with a low degree of crosslinking called "loose" gel, to distinguish it from the less desirable "tight" gel, which is of a high degree of cross-linking The "gel content" of the polymers envisaged is to be defined as the content of the polymer which is insoluble in toluene at 30° C. As a rule very high gel contents, say higher than 60%w, are to be avoided, because the processability of the polymers then becomes too poor and the tensile strength of the vulcanized products decreases too much.

Therefore, the gel content of the polymeric material in the final dispersion is confined within the range of 5–60%w.

If blends are envisaged of redox-modified polymers with other polymers, the polymer dispersion (A) obtained with the redox system can be treated still further, i.e., up to 90% gel and then blended with a solution or an aqueous dispersion (B) of the other polymer, particularly of a conjugated diene polymer which is different from the modified polymer obtained by the said redox treatment to give blends containing 5–60% gel. Preference is given to blends in which the different conjugated diene polymer present in solution or dispersion (B), and the polymer to be modified by the treatment with the redox system, are identical.

The latter case is of special importance if the redox-treated polymer should have too high a gel content. Polymeric material having the desired gel content can then be obtained by blending the redox-treated polymer dispersion (A) with the solution or aqueous dispersion (B) of the original non-modified polymer. It is also possible to make blends of aqueous dispersions of redox-treated polymers of different origin or of redox-treated polymers of the same origin, but having different gel contents. The most attractive blending method is mixing the redox-treated aqueous dispersion (A) with a solution (B) of the different conjugated diene polymer and subsequently removing the solvent introduced with the said polymer solution. If desired, an additional amount of emulsifying agent is supplied before, during or after blending in order to ensure the stability of the latex during blending or solvent-removal.

EXAMPLE I

A 10%w solution of a gel-free isoprene polymer, obtained by solution polymerization of isoprene in the presence of a lithium hydrocarbyl initiator and a hydrocarbon mixture mainly comprising pentene isomers as the solvent, was mixed with 0.3%w (on polymer) of 2,6-di-tert-butyl-4-methylphenol as antioxidant and subsequently emulsified in distilled water by means of an anionic soap. Then the unconverted monomer and the solvent were removed from the emulsion by steam distillation, whereupon the resulting stable aqueous polymer dispersion was concentrated until it contained 65%w of solids (63.7%w of polymer and 1.3%w of soap). The intrinsic viscosity of the polymer, determined in toluene at 30° C., was 5.3 dl/g.

To 100 parts by weight of the said concentrated aqueous polyisoprene dispersion (which was still stable) 0.09 part by weight of a 70%w solution of cumene hydroperoxide in cumene was added at 25° C. The mixture was stirred gently for about 2 hours in order to ensure a sufficient diffusion of the hydroperoxide into the latex. Then the following components and amounts thereof (in parts by weight) were supplied to the dispersion while gentle stirring was continued:

| | |
|---|---|
| $FeSO_4.7 H_2O$ | 0.01 |
| Disodium dihydrogen ethylene diamine tetraacetate.$2 H_2O$ | 0.014 |
| Sodium formaldehyde sulfoxylate | 0.10 |
| Water | 5.0 |

After a reaction period of 2 hours at 25° C., 0.15 part by weight of sodium dimethyl dithiocarbamate, dissolved in 2.0 parts by weight of water, was added and the resulting latex, which had a total solids content of about 61%w, was coagulated by means of an aqueous solution of sodium chloride and sulfuric acid. The coagulated modified isoprene rubber was isolated and dried. It proved to have a gel content of 53%w (being the content of the part which was insoluble in toluene at 30° C).

100 Parts (by weight) of the dried modified isoprene rubber were blended on a mill at 70° C. with 50 parts of HAF black, 3 parts of stearic acid and 5 parts of ZnO. Sheets of 2 mm were prepared from the milled sheets by pressing at 80° C. for 5 minutes. The tensile strength and the elongation at break of the unvulcanized pressed sheets were determined according to ASTM - D 412 - 61 T, die C.

For comparision the tensile properties of pressed sheets from the unmodified isoprene rubber were determined in the same manner (blank).

The results are collected in Table I.

TABLE I

| Unvulcanized Pressed Sheets From | Tensile strength, $kg/cm^2$ | Elongation at Break, % |
|---|---|---|
| Modified isoprene rubber | 4.2 | 630 |
| Unmodified isoprene rubber (blank) | 0.6 | 290 |

EXAMPLE II

The experiment described in Example I was repeated, the differences being that instead of 0.09 part of the cumene hydroperoxide solution 0.3 part of the said solution was used and that after addition of the other components of the redox system the reaction period was one-half hour instead of 2 hours. Part of the latex thus obtained, which again had a solids content of 61%w, was coagulated and dried. The gel content of the resulting modified polyisoprene was about 90%w, which is too high if polymers having a good processability are envisaged.

Therefore, 100 parts of the redox-treated latex were blended with 2600 parts of the original 10%w solution of the unmodified gel-free polyisoprene (from which solution the aqueous emulsion and subsequently the solvent-free latex to be treated with the redox system were prepared). Then, this latex/solution blend was steam-stripped in order to remove the solvent introduced with the solution. As the soap content of the said blend was too low for ensuring the stability of the latex during steam stripping, the mixture of modified and unmodified isoprene polymer precipitated during this treatment. The precipitated rubber mixture was separated, washed and dried and proved to have a gel content of about 17%w.

100 parts of the said dry rubber blend were mixed on a mill at 70° C. with 50 parts of HAF black, 3 parts of stearic acid and 5 part of ZnO. The tensile strength and the elongation at break of unvulcanized 2-mm sheets (obtained by pressing for 5 minutes at 80° C.) of the said composition were determined as described in Example I. The same procedure was followed for testing the tensile properties of pressed sheets of the modified rubber with a gel content of 90%w. The results are shown in Table II, which, for comparison, also reveals the tensile properties of the blank, already mentioned in Table I.

TABLE II

| Unvulcanized Pressed Sheets From | Tensile Strength, kg/cm² | Elongation at Break, % |
| --- | --- | --- |
| Blend of modified and unmodified isoprene rubber (18%w gel) | 5.2 | 830 |
| Modified isoprene rubber (90%w gel) | 10.5 | 720 |
| Unmodified isoprene rubber (blank) | 0.6 | 290 |

EXAMPLE III

From four different latices A, B, C, and D test slabs were prepared according to the coagulant dipping procedure as described hereinafter. Latex A was the concentrated latex of the gel-free unmodified polyisoprene, described in Example I. Latices B, C, and D were modified polyisoprene latices obtained from latex A by a redox treatment according to the present invention. Latex C was prepared as described in Example I. Its solids content amounted again to 61%w. Latex B and Latex D were obtained according to the same recipe but with the difference that 0.02 part by weight (latex B) or 0.15 part by weight (latex D) of the 70%w solution of cumene hydroperoxide was used instead of 0.09%w. The gel content of the modified polyisoprene in the redox-treated latices B and D was 18%w and 78%w, respectively. The solids content of both these latices was 63%w.

The coagulant dipping procedure for preparing the test slabs was carried out as follows. Each latex was compounded by adding aqueous dispersions or aqueous solutions of the vulcanizing ingredients as tabulated below, the concentrations and amounts of which being indicated as well.

| Latex | %w Solids 65–61 | phr* Dry Solids 100 |
| --- | --- | --- |
| Ammonium caseinate | 10 | 0.5 |
| Sulfur | 50 | 1.5 |
| Zinc dimethyl dicarbamate | 50 | 1.0 |
| A C₇-amine prepared by condensation of heptanal and aniline | 50 | 0.5 |
| Dibutyl ammonium oleate | 10 | 0.5 |
| 2,2'methylene-bis(4-ethyl-tert-butylphenol) | 33 | 2.0 |

*phr = parts per hundred parts of rubber.

After dilution of the latices with distilled water to a solids content of 51%w, glass plates, on which the test slabs were to be formed, were dipped first in a 30% solution of calcium nitrate in ethanol and subsequently in the compounded latex to be evaluated. The polymer in the latex adhering to the glass plates was allowed to settle for 30 minutes at room temperature, whereupon the films obtained were leached in water having a temperature of 50° C. for 30 minutes dried at 60° C for 3 hours and cured at 110° C. for 45 minutes.

Tensile properties of the vulcanized test slabs thus prepared were determined according to ASTM D 412–61 T, die D. The results are recorded in Table III.

TABLE III

| Vulcanized Test Slab From: Polymer with a gel content (%w) of: | Latex A (blank) 0 | Latex B 18 | Latex C 53 | Latex D 78 |
| --- | --- | --- | --- | --- |
| Modulus 300%, kg/cm² | 13 | 15 | 16 | 16 |
| Modulus 500%, kg/cm² | 24 | 29 | 30 | 34 |
| Modulus 700%, kg/cm² | 52 | 73 | 88 | 117 |
| Tensile strength, kg/cm² | 350 | 380 | 370 | 280 |
| Elongation at Break, % | 970 | 960 | 930 | 840 |

We claim as my invention:

1. A process for the preparation of a modified polymer of a synthetic conjugated diene from a solution polymer of a conjugated diene prepared by means of a lithium hydrocarbyl compound which comprises:
   a. treating at a temperature within the range −10° to +50° C. (A) an aqueous dispersion of the solution polymer with a redox system containing a hydroperoxide initiating compound at a concentration within the range of 0.0001 to 0.5 percent of —OOH groups based on polymer in the substantial absence of a monoolefinically unsaturated monomer until the polymer has a toluene insoluble gel content 5–60 percent by weight;
   b. continuing the treatment to obtain a product having less than 90 percent by weight toluene insoluble gel; and
   c. blending the product so obtained with (B) a solution or aqueous dispersion of a conjugated diene polymer having a toluene insoluble gel content less than 60 percent by weight, whereby a diene polymer composition having 5–60 percent by weight toluene insoluble gel is obtained.

2. A process according to claim 1, in which (B) is a solution of an unoxidized conjugated diene polymer.

3. A process according to claim 1 in which the conjugated diene polymer in solution or dispersion (B) is identical to the polymer in aqueous dispersion (A) prior to modification thereof by treatment with the redox system.

* * * * *